Figure 8:
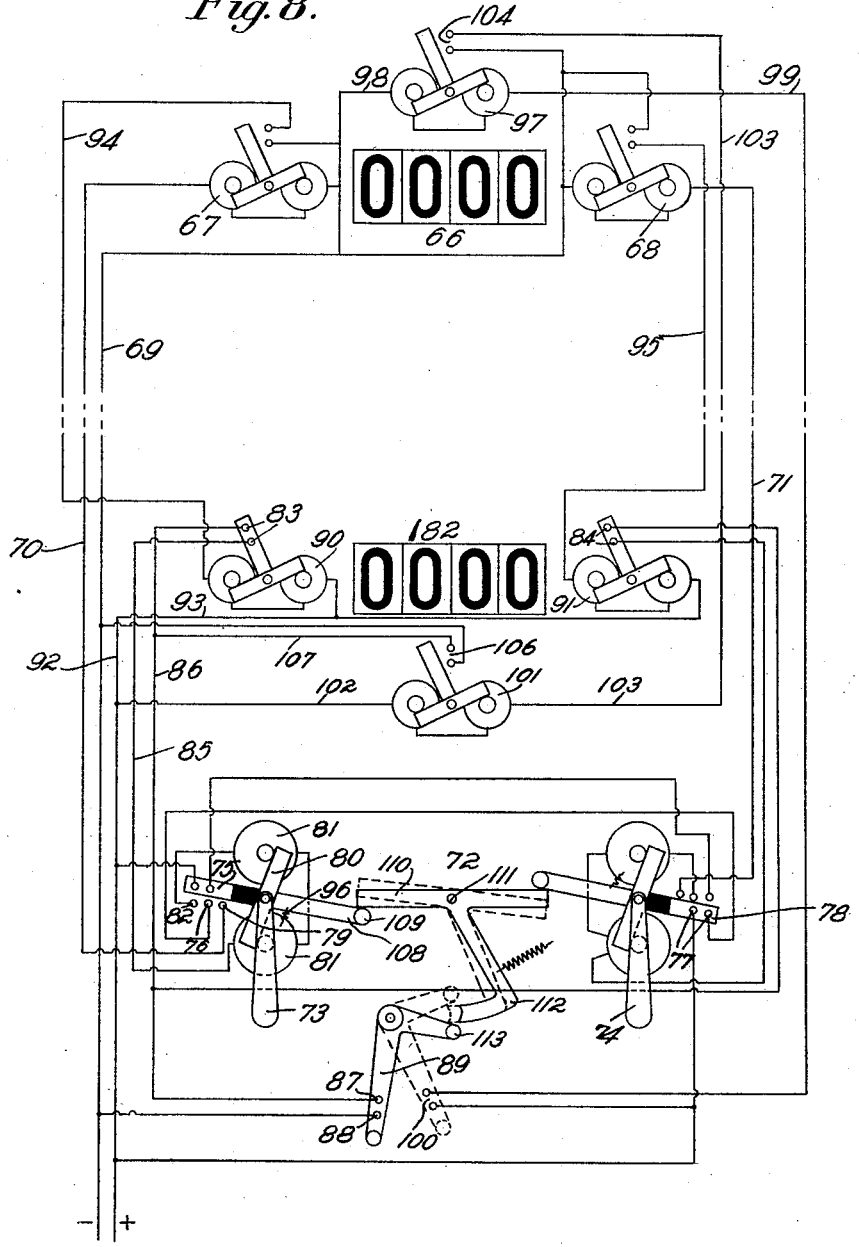

F. A. EMERY & A. A. ADAMS.
SIGNALING SYSTEM.
APPLICATION FILED MAR. 13, 1909.
1,114,597.
Patented Oct. 20, 1914.
3 SHEETS—SHEET 1.
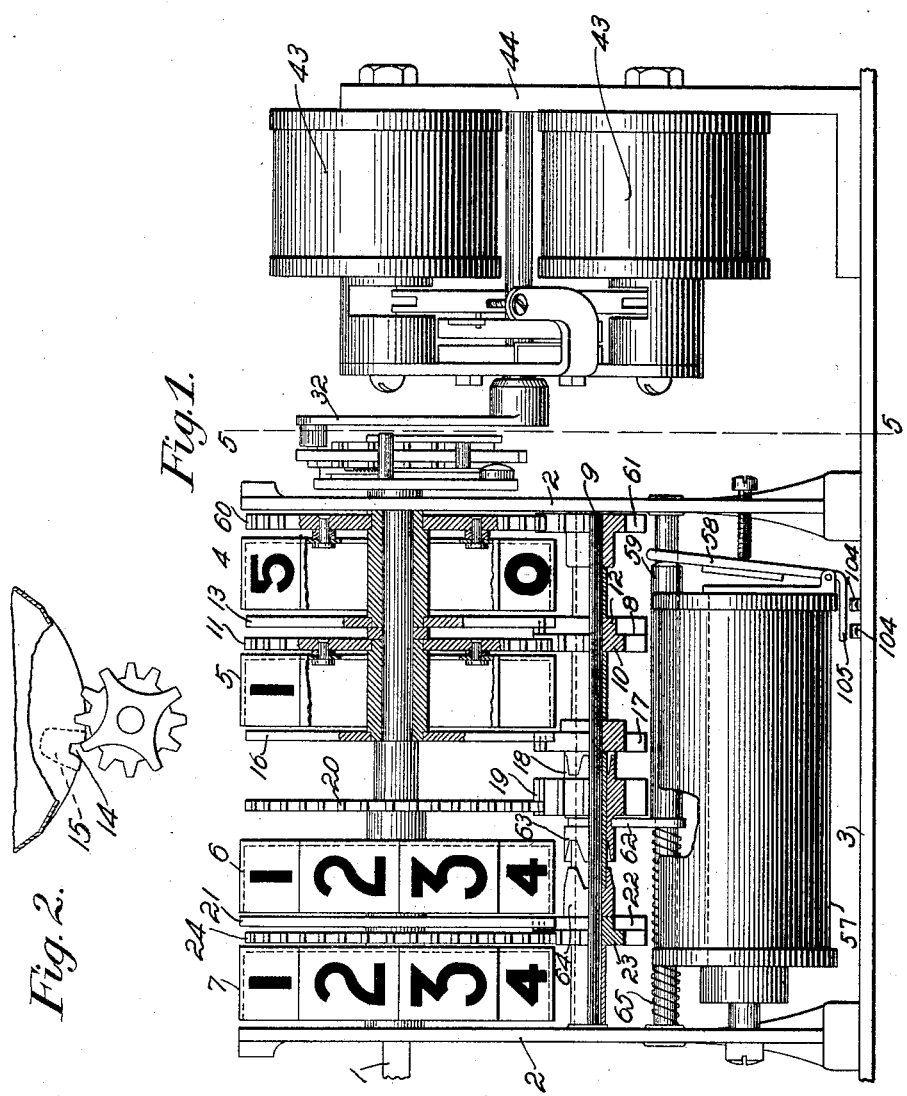
Witnesses:
Robert H. Kammler.
Horace H. Crossman.
Inventors:
Arthur A. Adams
Frank A. Emery
by Emery & Booth.
Attys.

F. A. EMERY & A. A. ADAMS.
SIGNALING SYSTEM.
APPLICATION FILED MAR. 13, 1909.
1,114,597.
Patented Oct. 20, 1914.
3 SHEETS—SHEET 2.
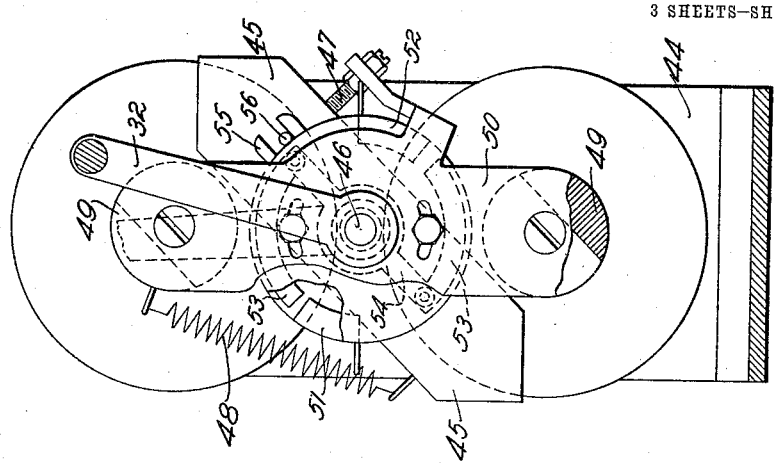
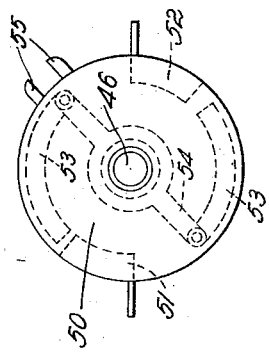
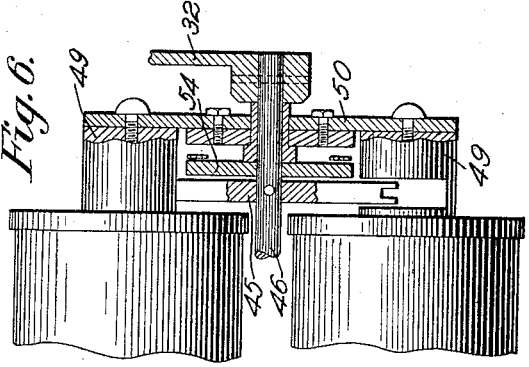
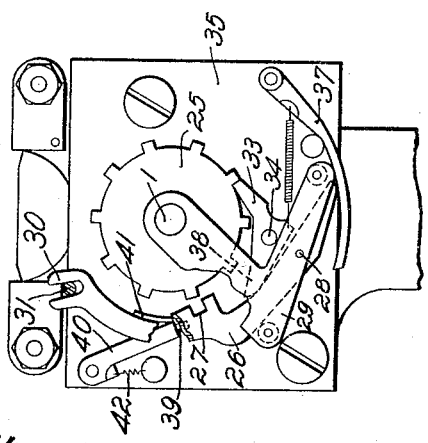
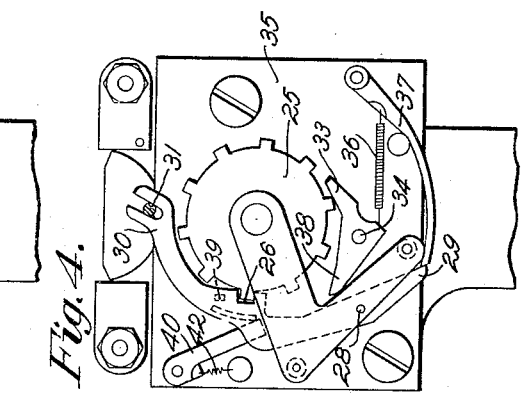
Witnesses:
Robert H. Kammler.
Horace A. Crossman
Inventors:
Arthur A. Adams
Frank A. Emery
by Emery + Booth
Att'ys.

F. A. EMERY & A. A. ADAMS.
SIGNALING SYSTEM.
APPLICATION FILED MAR. 13, 1909.

1,114,597.

Patented Oct. 20, 1914.

3 SHEETS—SHEET 3.

Witnesses:
Robert H. Kammler.
Horace H. Crossman.

Inventors:
Arthur A. Adams
Frank A. Emery
by Emery + Booth
Att'ys.

UNITED STATES PATENT OFFICE.

FRANK E. EMERY, OF ASHMONT, AND ARTHUR A. ADAMS, OF BROOKLINE, MASSACHUSETTS, ASSIGNORS, BY MESNE ASSIGNMENTS, TO ATLANTIC NATIONAL BANK, OF PROVIDENCE RHODE ISLAND, A CORPORATION OF RHODE ISLAND.

SIGNALING SYSTEM.

1,114,597.

Specification of Letters Patent.     Patented Oct. 20, 1914.

Application filed March 13, 1909. Serial No. 483,155.

*To all whom it may concern:*

Be it known that we, FRANK A. EMERY, and ARTHUR A. ADAMS, citizens of the United States, residing, respectively, at Ashmont, in the county of Suffolk, and Brookline, in the county of Norfolk, both in the State of Massachusetts, have invented an Improvement in Signaling Systems, of which the following description, in connection with the accompanying drawings, is a specification, like letters on the drawings representing like parts.

Our invention relates to signaling systems, being herein shown as embodied in a system for transmitting indications of range for use upon naval vessels, coast fortifications, or the like. It is to be understood, however, that our invention may have application to other purposes as well, its embodiment in the above form being herein submitted wholly for illustrative purposes.

In signaling systems employed for the indication of range-value changes, it is a usual practice to indicate such changes at each receiving sation by means of increments or decrements in the indicated range value, these being produced by a step-by-step movement of an actuating mechanism controlled at the sending station by a suitable controlling device. In range signaling, however, range values usually require for their expression figures of several places,— ordinarily four or more. If the usual train of indicating wheels, counters, or other indicating units is employed, wherein the "tens" wheel executes one movement only for each ten movements of the "units" wheel, and each other secondary unit moves once only for a number of movements of its primary or preceding unit, a great many movements of the controlling member are required when it becomes necessary to reset the indicator at some value materially different from that then displayed by the indicator. Thus,—if four indicating units are used and the number displayed is 1850, should it become necessary to reset the indicator to display the number 450, 1400 beats or movements of the actuating mechanism would be necessary to effect this change. This is not only a laborious operation, but consumes valuable time and often at a critical period.

One object of the present invention is to provide means under the control of the operator at the sending station whereby the indicator may be reset to any desired position without the necessity of the usual number of movements of the actuating mechanism and the process of resetting the instrument be materially simplified and facilitated thereby. Our invention, as to this and other features, will be best understood by reference to the following description when taken in connection with the accompanying illustration of one specific embodiment thereof, while its scope will be more particularly pointed out in the appended claims.

In the drawings: Figure 1 is a front elevation, partially broken away and in partial section, showing a train of indicating members such as may be employed in a range signaling receiver employed in connection with one embodiment of our invention; Fig. 2 is a detail, partly in section, showing the star-wheel and gear connection between connected indicator wheels; Fig. 3 is a side elevation, partly broken away, showing the ratchet and pawl actuating mechanism for the indicator in one position; Fig. 4 is a similar view, showing the ratchet and pawl mechanism in another position; Fig. 5 is a sectional elevation on line 5—5 in Fig. 1, showing one set of actuating magnets with the related contact devices; Fig. 6 is a central sectional elevation taken through the armature and adjacent magnet parts and showing the relation of the contacts; Fig. 7 is a detail elevation of the two contacts; and Fig. 8 is a diagram of circuit connections showing one embodiment of our invention in a range signaling system.

Referring to the disclosed embodiment of our invention, we have shown in Fig. 1 an ordinary form of indicating device suitable for indicating different numbers covering any desired range or scale, but herein ranging from 0 to 20000, this being the maximum range value ordinarily required to be displayed. Since increments and decrements in range value are ordinarily required for every fifty yards only, the fifth or actual units figure may be provided by a stationary, dummy screen or background showing the value 0. This permits the required range values to be indicated by four movable counters or wheels, which are shown in the drawings as consisting each of a ten-sided, polygonal shell mounted upon the indicator shaft. The latter is journaled in brackets 2 fixed upon the base plate 3.

The indicating unit 4, which is the apparent "tens" wheel, considered with reference to the dummy has displayed on successive faces of its perimeter the figures 0, 5, 0, 5, etc. The indicating wheel 5, hereinafter termed the "tens" wheel and the wheel 6, hereinafter termed the "hundreds" wheel, have each the ten figures 0, 1, 2, etc., on its respective ten faces. The wheel 7, hereinafter termed the "thousands" wheel, has displayed on three of its faces the figures 0, 1 and 2. The remaining faces may be left blank or as shown provided with consecutive numerals like the "hundreds" wheel.

The "units" wheel 4 is pinned or otherwise fixed to the shaft 1, while the "tens" wheel 5, the "hundreds" wheel 6, and the "thousands" wheel 7 are each mounted upon, but free to rotate about, the said shaft 1. The shaft and "units" wheel are turned one-tenth of a revolution in either direction on the excitation of one or the other of two sets of actuating devices, which will be more fully described. The completion of the cycle of two movements of the "units" wheel (displaying, as it does, increments of 5) effects a tenth of a revolution of the "tens" wheel, by any suitable means, such as a usual form of star-wheel and pinion 8. The latter is loosely mounted upon an adjacent counter-shaft 9, and consists of a gear cut portion 10, meshing with a gear 11, fixedly secured to the "tens" wheel 5, and a star-wheel portion 12, the latter adapted to engage with the edge of a disk 13, fixedly secured to the "units" wheel 4. The star-wheel is formed by cutting away a number,—herein 2—of the teeth of the gear adjacent one face thereof, and the remaining teeth are caused to bear against the edge of the disk to prevent rotation of the star-wheel, except when there is brought into registration with one of its teeth a notch 14, cut in the edge of the disk. At the location of the notch, the disk is also provided with a notched lug 15, which engages the teeth of the gear and acts to turn the latter, when the star-wheel is thus freed by coincidence of the notch with its tooth. The lugs and notches are so located that the "tens" wheel is moved when the "units" wheel moves to bring the zero (0) mark into reading position in place of the 5, or vice versa. The "hundreds" wheel and the "thousands" wheel are moved in substantially the same way. That is to say, the "tens" wheel 5 is provided with a notched disk 16, adapted to engage the star-wheel 17. The latter is also loose upon the shaft 9 and normally clutched by means of the clutch teeth 18 to the gear, or pinion 19, which meshes with the gear 20, the latter fixedly secured to the "hundreds" wheel 6. The latter, in turn, has the notched disk 21 engaging the star-wheel 22, the latter being cut upon one side of the gear 23, which meshes with the gear 24 fixed to the "thousands" wheel 7. The star-wheel 22 and gear 23, are mounted loosely for free rotation about the shaft 9. The disks 16 and 21, it will be understood, are provided each with but one notch positioned to cause the succeeding driven counter or wheel to move when the preceding wheel has turned to bring the zero mark into position in place of the nine, or vice versa. It will be obvious that through the step-by-step actuation of the "units" wheel in one direction or the other, the number displayed by the four indicating wheels may vary by increments or decrements to any extent desired within the limits referred to.

Referring now to the step-by-step actuating mechanism, there is provided at each end of the main shaft 1 a ratchet and pawl moving device and electromagnets for actuating the same, one to turn it in one direction and the other in the opposite direction. Although one set only of such devices is shown in Fig. 1, it will be understood that the remaining set operates in substantially the manner about to be described, although in a reverse direction.

Referring to Figs. 1, 3, and 4, the indicator shaft 1 has fixedly secured thereon a toothed ratchet wheel 25. This is adapted to be engaged by a pivoted pawl 26, having the notch 27 formed on its inner edge corresponding in shape to the ratchet tooth. The pawl is pivotally mounted at 28 upon an oscillating support 29. The latter is formed by V-shaped plates between which the pawl is pivotally held, the plates being mounted to swing about the shaft 1. The opposite end of the pawl is provided with a pair of upturned ears 30, between which there works a pin 31, carried by the actuating arm 32. When the magnets are energized, the arm moves the pin 31 to the position shown in Fig. 4. A pivoted locking finger 33 is provided, fulcrumed at 34 upon the plate 35. This locking finger rests against a pawl tooth and normally prevents advance movement of the ratchet and the indicator. Movement in the opposite direction is of course prevented by the locking finger for the other ratchet wheel, the advance movement of which is in the opposite direction. A spring 36 normally draws the locking finger against the ratchet, the spring being secured to the pivoted lever 37. The locking finger, however, his a projecting end 38, which rests against the inner edge of the pawl 26, and, as the latter is moved to engage a tooth, it withdraws the finger from engagement with the pawl. The ratchet, however, is not released by the finger until the pawl has positively engaged its adjacent tooth. When the ratchet has moved far enough to allow the finger to slip into the next notch (see Fig. 4), it moves into the same, thereby preventing movement of the ratchet for more than one notch at a time. To prevent movement of the pawl without movement of the ratchet or on partial feeding movement only of the pawl, there is provided a lug 39 on the inner face of the pawl and projecting toward the plate 35, which lug in the inactive position of the pawl (Fig. 3) abuts against the end of a swinging gate arm 40, and is prevented thereby from feeding movement without first moving toward the ratchet to engage a tooth. On movement of the actuator arm, therefore, the pawl is first swung inward about its pivot 28, until engaged with the ratchet, after which the actuating arm then swings the pawl with its oscillating support 29 as a unit to the position shown in Fig. 4, the lug 39 passing freely within the guiding plate or flange 41 during such movement. On completion of this movement, the lug emerges from the control of the flange 41, and release of the pawl can then take place on backward movement of the pin 31. When this occurs, the pawl first swings outward about its pivot 28, disengaging from the ratchet and bringing the lug 39 on the outside of the guiding flange 41, in which position the lug and flange prevent the pawl from again engaging with the ratchet until fully restored to its initial position, as represented in Fig. 3. On such return movement, the gate member 40, which is normally held against the guiding flange by a spring 42, swings out to allow the lug to pass between it and the flange.

Referring to the electromagnetic actuating devices, both sets of magnets are of substantially the same construction, although reversely arranged. The magnets 43 are mounted upon the yoke 44 of magnetic material, and are supported on the base plate 3. The armature 45 (see Figs. 5 and 6) is secured to the rock shaft 46, and is normally drawn against the fixed adjustable stop pin 47 by the spring 48, so that its axis is oblique to the field of the magnet. The rock shaft carries fixed upon its end the pawl actuating arm 32. The magnet pole pieces 49 are cut away as represented in Fig. 5, to allow the armature to swing in line with a field of the magnet when energized, this acting to turn the rock shaft and swing the pawl actuating lever into the dotted line position shown in Fig. 5. By the closure, therefore, of one or another of two transmitting circuits, leading from the transmitting station, one or the other of the two sets of magnets is energized and its corresponding pawl arm caused to swing over. On the opening of the circuit, such pawl arm is swung back by the spring 48.

As will more fully appear, we preferably employ in connection with the described indicator at the distant station, a similar indicator to act as a repeater at the transmitting station, such repeater being actuated on the display of the signal at the receiver. To provide for such repeater actuation, electrical contacts are employed which are closed as soon as the actuating pawl has executed its full movement. For this purpose, there is provided at each armature the fixed contact carrying disk 50, which carries the contacts 51 and 52, connected one to the repeater circuit, and the other to the negative main, as will more fully appear. These are adapted to be bridged by the bridging contact 53, the latter carried by the disk 54 of insulating material which is loosely mounted on the rock shaft 46. The disk 54 is provided with two radially projecting lugs 55, between which there works, with more or less play, a pin 56, carried by the armature 45. With the magnets deënergized, the armature, acting through the aforesaid pin and lugs, holds the disk 54 in such position as to separate the bridging contact 53 from the fixed contacts 51 and 52 (as shown in Fig. 5) but with the magnets energized the pin strikes one of the lugs and swings the disk into circuit closing position. The remaining set of magnets, used for turning the indicator in the opposite direction, is provided, as will be understood, with contacts similar to those already described.

Referring again to the indicator train, we have provided means whereby, at will, and under control of the operator at the transmitting station, connections may be effected between the indicator wheels so that two or more of the wheels, normally connected in train, may be moved in unison and to the same extent whereby resetting of the instrument can be quickly accomplished. This may be accomplished in various ways, but herein there is provided an electromagnet 57, having the pivoted armature 58, which is adapted to work against the sliding plunger sleeve 59, the latter controlling a clutch device of such construction that when thrown by the energization of the magnet, one of the follower wheels, herein the "hundreds" wheel, is clutched directly to one of the preceding wheels of the train, herein the "units" wheel, so that it is turned equally therewith. To this end, there is provided a gear 60, fixed on the main shaft 1, which gear meshes with a pinion 61 fixedly secured to the countershaft 9, so that the latter is caused at all times to be driven by the main shaft 1. The sliding sleeve 59 carries a yoke 62, which embraces a grooved portion in the sliding gear member 19, so that when the magnet is energized such gear member, while still engaging with the tooth of the gear 20, may be slid along the countershaft 9 to disengage the clutch teeth 18, thereby releasing the star-wheel 17, and causing engagement between a corresponding set of teeth 63 at its opposite end with the teeth of a clutch 64, secured to the counteshaft 9. The result is that when the clutch is thrown, the "hundreds" wheel 6 is disconnected from the train, and, with the "units" wheel, connected to be driven directly by the main indicator shaft 1. Where conditions make it desirable, two or more of the following wheels of the train may be thus directly clutched to the main driving shaft, but, in the particular application herein made of our invention, sufficient simplicity is secured by clutching merely the "hundreds" wheel thereto. When the magnet 57 is deënergized, a spring 65 returns the sleeve and the clutch to its normal position, replacing the indicator wheels in their geared relation to the train.

Referring now to Fig. 8, we have therein shown diagrammatically the elements of a system employing an indicator of the type described. The indicator is designated by the numeral 66, while its electromagnetic actuating devices for increments are designated by 67, and for decrements by 68. Both sets of magnets are connected at one side with the negative main 69, and the other with transmitting circuits 70 and 71, respectively, each leading to suitable controlling devices at the transmitting station 72. At the transmitting station, circuit controlling devices are provided, one, 73, for actuating the increment magnets 67, and the other, 74, for actuating the decrement magnets. Both switches and their controlled contacts are of substantially the same construction, and only one need be described in detail. Referring to the increment switch 73, the latter is provided with a switch arm carrying the bridging contact 75. A contact 76, normally open, is provided, which contact is connected with the positive main but first passes through the non-interference contacts 77 at the decrement switch 74. The contacts 77 are normally bridged by the bridging contact 78 at the switch 74, but when the latter is moved to actuate its distant receiver, such contacts are broken and the switch 73 rendered inoperative until the switch 74 has been brought back to its normal position. When the switch 73 is moved to its active position, the positive contact 76 is connected with contact 79, which latter is connected with the transmission circuit 70, so that the increment magnets 67 are energized.

The switch arm 75 is secured to an oscillating armature 80 of the same type as the armature 45 used at the receiver, and there is also provided the holding magnets 81. When the switch 73 is thrown the positive main is also connected to a third contact 82, completing a circuit through the magnet coils 81, this serving to hold the armature and the switch in active position until after the indicator at the receiver has undergone an indicating movement. At the transmitting station there is also preferably employed a second indicating instrument 182 of substantially the same construction as the receiver, save that the contacts 83 and 84 controlled by its armatures are normally closed or bridged instead of being normally open, but are adapted to be opened on the movement of its indicator mechanism. The circuit for the holding magnets 81 passes from the contact 82 through the magnets, and thence through the conductor 85 to the repeater contacts 83, whence it leads to the conductor 86 and contact 87, contact 88, and back to the negative main. The contacts 87 and 88 are normally bridged by the auxiliary or resetting switch 89 so that, with the repeater inactive, the circuit for the magnets 81 is completed as soon as the handswitch 73 is moved. The repeater magnets 90 and 91 are connected on the one side to the positive main 92 through the conductor 93, and on the other side through connections 94 and 95, leading, respectively, to the negative main through the normally open contacts at the receiver magnets 67 and 68. As soon, therefore, as the transmitting switch has been moved and the receiving indicator has moved in turn, the repeater circuit 94 is closed at the receiver contacts and the repeater magnet 90 energized, thus displaying at the repeater the same indication which is displayed at the receiver. Simultaneously with the movement of the repeater, the holding magnet circuit 86 is broken at the repeater contacts 83 and the switch is free to be thrown back to an open position, by the hand of the operator, or will be thus thrown back automatically, if released, by means of the spring 96. It thus follows that the repeater will display its indication only after such indication has been displayed at the receiver, and that the transmitting switch is locked against movement until, not only the receiver, but the repeater as well has moved.

In order to operate the resetting clutch device at 97, the auxiliary switch 89 is provided. The clutch magnet is connected to the negative main through the conductor 98, and to the positive main by the conductor 99, which latter, however, first passes through the normally open contacts 100 at the auxiliary switch. If the auxiliary switch is thrown from the full line position shown in Fig. 8 to the dotted line position, the clutch magnet 97 is thereupon energized and the "hundreds" wheel and "units" wheel may be operated together by the manipulations of the switches 73 and 74, as previously described.

The operation of the resetting device will be clear from the following. If, for example, the counter wheels 7, 6, 5, and 4 are set to give the reading 1235 and it is desired to reset them to the reading 0150 without the aid of the resetting device this act would require 217 beats of the transmitting switch. By throwing the resetting clutch, however, so that the "hundreds" wheel moves with the "units" wheel the indicator reading can be reduced in ten beats to 0185. If the operator then throws out the resetting clutch and further reduces the indicator reading by seven beats of the transmitting switch, the reading then becomes 0150, this change being accomplished by a total of seventeen beats of the transmitting switch.

In order that the movements of the repeater may correspond exactly to the movements of the receiver in relation to the resetting devices, the resetting device 101 for the repeater is connected on one side to the positive main through the conductor 102, and on the other side to the negative main through the conductor 103, which latter, however, is normally broken by the contacts 104 controlled by the resetting magnet 97 at the receiver. Such contacts may actually be arranged in any desired position at the indicator, but in Fig. 1 they are shown as controlled by the bridging contact 105, carried by an extension of the armature lever 58.

When the resetting clutch is moved by movement of the auxiliary lever 89, the contacts 104 are bridged, energizing the clutch magnet 101 at the repeater. This in turn, causes the bridging of the normally open contacts 106, which contacts are included in a branch 107, extending from the conductor 86 to the negative main. This provides for connecting the holding magnets to the negative main once more, their circuit connection having been broken at the contacts 87 and 88 by movements of the auxiliary switch. When the switch is thrown, therefore, the clutch at the receiver is first moved and this is followed by the movement of the clutch at the repeater. Until the last named clutch is thrown it will be seen that the holding coils are cut out of circuit by the break at the auxiliary switch.

In order to provide against the movement of the resetting device when the transmitting devices are active, or vice versa, interlocking means are preferably provided. Such interlocking means may be electrical in their nature, but herein I have shown mechanical interlocking devices such that the resetting switch cannot be moved except when both transmitting switches are in a normal or inactive position; and, on the other hand, neither transmitting switch can be moved except when the resetting switch is occupying one or the other of its active positions corresponding to the full or dotted line position shown in Fig. 8. To this end, both transmitting switches are provided with an arm 108 which carries a roller 109 bearing against one arm of the two-armed lever 110. The latter is fulcrumed at 111, and so related to the switches that movement of either one toward an active position swings the lever to the dotted line position shown. The lever carries an arm having the curved finger 112 and the latter is so arranged to overlie a roller 113 carried by an arm on the auxiliary switch lever 89, so that, with the finger in the dotted line position shown, the switch lever cannot be moved from either of the two positions indicated. On the other hand, during the movement of the switch lever from one position to the other, the movement of the finger is opposed by the roller 113.

In the practical installation of a range signaling system embodying our invention, any desired number of receiving stations may be employed, utilizing at each an indicator connected in multiple with the transmitting switches at the sending station. Such separated indicators may have their several resetting clutch magnets also connected in multiple, but would preferably have their controlled contacts so connected to the clutch magnet for the common repeater at the transmitting station that the latter would not operate until the last receiver clutch magnet had completed its full movement.

While we have herein shown and described for purposes of illustration one specific form of our invention, it is to be understood that the same is not limited to the particular application herein made of the same, or to the specific constructional details, or arrangement of parts or circuits herein disclosed, but that extended deviations may be made from the disclosure herein without departing from the spirit of the invention.

Claims.

1. In a range signaling system, the combination with a range indicator comprising indicating members, bearing each a plurality of symbols, moving mechanism to cause the movement of a member expressing a value of higher order to follow a plurality of movements of a member expressing a value of lower order, means to control said movements from a distance, and resetting means to cause both members to move equally whereby the indicator may be reset to indicate a given value by movements of the member of lower value.

2. In a signaling system, an indicator having a train of indicating wheels, gearing connections to cause a following wheel to move once only for a plurality of movements of the preceding wheel, means to impart a step-by-step movement to the preceding wheel, and means for connecting a following wheel to move with its preceding wheel.

3. In a signaling system, the combination with a step-by-step indicator of electromagnetic devices for moving said indicator one step at a time in either direction, the said indicator comprising a primary indicating member and a secondary member, the latter connected to be moved once only for a plurality of movements of the primary member, means for controlling said electromagnetic devices from a sending station, and means also controllable at the sending station to couple said secondary indicating member to be moved with each movement of the primary indicating member.

4. In a signaling system, the combination with a step-by-step indicator, with means at a distance for actuating the same either incrementally or decrementally, said indicator comprising a train of indicating members and a resetting device for said indicating members, also controllable at a distance.

5. In a signaling system, the combination with a transmitting station, of a receiver, a repeater, means for effecting a normal indication change at the receiver, a quick-acting resetting device for the receiver controllable from the transmitting station, and a quick-acting resetting device for the repeater controlled by the resetting device at the receiver, said resetting devices serving to effect an indication change at the receiver and repeater respectively with greater rapidity than the normal indication change thereat can be effected.

6. In a signaling system, the combination with an indicator, means for imparting a step-by-step movement thereto, said indicator having a train of indicating members, a resetting device for changing the movement ratio of the train, a controlling member at the transmitting station for controlling the indicator movement, a second controlling member, the movement of which actuates said resetting device, and means for preventing the movement of said resetting controlling member except when said indicating controlling member is at an inactive position.

7. In a signaling system, the combination with an indicator of means for imparting a step-by-step movement thereto, said indicator comprising a train of indicator wheels, a resetting device for providing a different ratio of movement for the train, a controlling member for said resetting device at the transmitting station having an active and an inactive position, a controlling member for the indicator movement, and means preventing the movement of said indicator controlling member when said resetting controlling member is at an intermediate position.

8. In a range signaling system, the combination with a transmitting station of a receiving station provided with an indicator, the latter having a plurality of indicating members connected in train, whereby the movement of one member follows a series of movements of a preceding member, a clutch for clutching said following member to move with its preceding member, electromagnetic means for operating the clutch, means for imparting a step-by-step movement in either direction, and controlling means at the transmitting station for the indicator moving means and the said electromagnetic means.

9. In a range signaling system, a receiver having an indicator, a transmitter, means controlled from said transmitter for normally moving said indicator in either direction, and quick-acting resetting means whereby said indicator may be moved more rapidly than the same is normally moved by said transmitter, said resetting means being also controllable at the transmitter.

10. In a signaling system, an indicator movable step by step in either direction, a sending station, a transmitter for normally moving said indicator step by step, and quick-acting resetting means whereby said indicator may be moved more rapidly than the same can normally be set by the transmitter, said resetting means being controlled by said sending station.

11. In a signaling system, an indicator comprising a plurality of indicating counters movable step by step in either direction and connected in train, a transmitter, and quick-acting resetting means whereby said indicator may be set more rapidly than the same can be normally set by said transmitter, said resetting means being controlled at the transmitter.

In testimony whereof, we have signed our names to this specification, in the presence of two subscribing witnesses.

FRANK A. EMERY.
ARTHUR A. ADAMS.

Witnesses:
EVERETT S. EMERY,
ROBERT H. KAMMLER.

---

Copies of this patent may be obtained for five cents each, by addressing the "Commissioner of Patents, Washington, D. C."